Patented Jan. 4, 1944

2,338,517

UNITED STATES PATENT OFFICE 2,338,517

METHOD OF POLYMERIZING ORGANIC COMPOUNDS

Ryukichi Kitani and Naoichi Takashima, Kawasaki, Kanagawa-ken, Japan, assignors to General Electric Company, a corporation of New York No Drawing. Application December 18, 1940, Serial No. 370,708. In Japan January 23, 1940

7 Claims. (Cl. 260—80)

The present invention relates broadly to a method of polymerizing polymerizable organic compounds, more particularly polymerizable organic compounds containing a

grouping. The invention is especially concerned with certain improvements and modifications in the art of coagulating emulsified polymeric materials.

When a polymerizable organic compound containing a

grouping, e. g., vinyl acetate, chloroprene (2-chlorobutadiene-1,3), etc., is polymerized while dispersed in a liquid media with which it is immiscible, that is, by the so-called "emulsion-polymerization" process, certain advantages accrue as compared with processes which involve direct polymerization of the monomer without a solvent or polymerization of the monomer while dissolved in some solvent. For example, when the monomers are polymerized in emulsified state the velocity of the polymerization reaction is greater as compared with other processes and, therefore, the total time required to effect polymerization of the monomer is lessened.

One objection to the emulsion-polymerization process has been the difficulty in obtaining a product which was polymerized to the desired degree. When an excess of coagulating agent was added in accordance with conventional practice to the emulsified polymer and the coagulated polymer then separated from the dispersion media, the isolated polymer often had properties quite different from that which was desired. This technique necessitated the addition of a relatively large amount of coagulant, which, because of the amounts employed, often had a detrimental effect upon the polymerized body. Furthermore, by this method it was exceedingly difficult to separate the unpolymerized material, or unpolymerized and low molecular weight bodies, from the desired high molecular weight compounds. When effort was made to remove the unpolymerized, or both unpolymerized and partially polymerized, compounds from the emulsion by distillation, the viscosity of the material being distilled often materially increased. This made it difficult effectively to carry out the distillation process and resulted in products which still contained a substantial amount of unpolymerized material. The products were non-uniform in quality and were unsatisfactory for many applications.

We have discovered that the above difficulties in the production of polymerized bodies by the emulsion process can be obviated, and high quality, uniform products of the desired degree of polymerization readily can be obtained, by the following procedure: The polymerizable material is first dispersed in a liquid media and thereafter polymerized. To the emulsified polymer is added a coagulating agent in an amount insufficient to cause coagulation of the polymer upon adding such agent to the emulsion but sufficient to cause coagulation when the emulsion is concentrated to a substantially lesser volume. The emulsion is concentrated in the presence of the coagulating agent to an extent such that coagulation of the dispersed polymer is effected. Finally, the coagulated solid polymer of desired degree of polymerization is isolated from the other components of the mass.

In carrying our invention into effect any suitable method may be employed in dispersing the monomeric or partially polymerized organic compound in a liquid dispersion media and in polymerizing the dispersed compound. For example, taking chloroprene as illustrative of the organic compound employed, unpolymerized chloroprene or a partial polymer thereof may be placed in a suitable receptacle, for instance a container of glass or synthetic organic material having smooth inner walls. To this compound is added an oxygen-free emulsifying liquid or dispersion media, for example an aqueous, dilute soap solution. The mass is now agitated by suitable means to form a dispersion of the polymerized chloroprene in the dispersion media.

Any suitable dispersion media may be used. For instance, it may consist of an aqueous solution of a soap such as sodium oleate, sodium palmitate, sodium stearate, sodium linoleate, etc., or of aqueous solutions of alkyl ester sulfates or various naphthalene sulfonates. We prefer to use a liquid dispersion media comprising water. Glue, agar-agar or such protective colloids as albumen may be added to stabilize the emulsion. Further, salts or acids may be added in order properly to adjust the concentration of ions in the emulsion. If the polymerizable compound is one which normally polymerizes relatively slowly, polymerization catalysts may be added, if desired, to accelerate polymerization of the dispersed organic compound.

The polymerization reaction is exothermic. When the evolved heat does not disperse quickly, the resultant polymer often is not homogeneous. With readily polymerizable compounds such as chloroprene, therefore, it is preferred to cool the mass, for example by using a jacketed container through which cooling water is passed or by placing the container in a bath maintained at a temperature of the order of 0 to 10° C. By simultaneous agitation and cooling in this way, the use of polymerization retarders (which sometimes are employed in slowing up the polymerization of chloroprene and other active polymerizable compounds) usually is not necessary and resilient polymers of good properties can be obtained as final products.

In emulsion-polymerization processes the character of the gas that is in contact with the emulsion is important. If such gas is air or oxygen, it may accelerate the polymerization non-uniformly and may result in the production of a hard, fragile polymer. It is therefore preferable to carry out the emulsification, concentration and coagulating steps while the mass undergoing treatment is exposed to an inert atmosphere, for example a nitrogen or krypton atmosphere or an atmosphere of other oxygen-free gas.

We have found that the higher the molecular weight of a dispersed polymeric body, the less the amount of coagulant ordinarily required to effect coagulation of the dispersed polymer. Large excesses of coagulant heretofore have been necessary due to the fact that in emulsion polymerization, the dispersed phase does not consist of a single high molecular weight body but of highly polymerized, lowly polymerized and unpolymerized bodies. The unpolymerized substances (or unpolymerized and partially polymerized materials) are interposed between particles of the highly polymerized bodies and thus materially lessen the readiness with which the higher molecular weight compounds can be coagulated. Furthermore, even with a large excess of coagulant it is possible to coagulate by the prior methods only those polymers having such high molecular weight that the coagulated polymer is unsuitable for many applications.

By adding a coagulating agent to the emulsified polymer in an amount insufficient to cause immediate coagulation, the coagulant-containing emulsion thereafter can be distilled to remove volatile matter (dispersion media, unpolymerized material and, also, if desired, lowly polymerized bodies) without any of the difficulties that heretofore have existed. Upon concentrating the emulsion, as by distillation, the coagulant causes the dispersed high molecular weight polymers to coagulate. The coagulated mass is separated from the undistilled liquid, water-washed, and freed from entrapped water, for example by working on rolls to press out the water followed by drying at a suitable temperature under atmospheric or sub-atmospheric pressures to remove the last traces of water. Chloroprene which has been polymerized, coagulated and isolated in this manner is a relatively soft body of good plasticity as compared with the hard bodies of low plasticity previously obtained. Furthermore, it can be worked readily on hot rolls and does not materially harden under heat. Antioxidants may be incorporated into the polymeric mass prior to, during or after the steps of washing and drying the coagulated mass. Advantageously an antioxidant is added to the liquid mass containing dispersed, at least partially polymerized organic compound prior to heating said mass to vaporize volatile components and to coagulate said dispersed compound.

Any coagulating agent may be employed. Illustrative examples of coagulating agents are salts, e. g., salts of polyvalent metals such as aluminum sulfate, magnesium chloride, barium chloride, etc., salts of monovalent metals such as sodium chloride, sodium sulfate, etc., acids such as formic acid, acetic acid, etc., magnesium sulfide, and the like. In certain cases it may be desirable to add the coagulating agent after first treating the emulsion with an alcohol, e. g., methyl alcohol, ethyl alcohol, isopropyl alcohol, etc.

In order that those skilled in the art better may understand how the present invention may be carried into effect, the following illustrative example thereof is given. All parts are by weight.

*Example*

Four hundred parts of refined chloroprene are placed in a suitable receptacle, for example a glass container. The container is evacuated to remove all air, nitrogen is introduced therein, the container is immersed in an ice bath and polymerization of the chloroprene is allowed to proceed under these conditions for about 48 hours. Thereafter, the partially polymerized chloroprene is washed first with a dilute alkali solution, for example a 1% caustic soda solution, and then with water.

The washed, partially polymerized chloroprene is mixed, in a suitable vessel provided with an agitator, with an oxygen-free, dilute, aqueous soap solution. Such a solution may be prepared, for instance, by dissolving 5 parts sodium oleate in 250 parts distilled water which has been boiled to remove any dissolved or entrapped air. The vessel is evacuated to remove air, after which nitrogen is introduced. The mass is vigorously agitated to produce a homogeneous emulsion. Agitation is continued, while cooling the container so that the temperature of the emulsion does not rise more than 10° C. over the initial (room) temperature of the mass. After 5 or 6 hours' agitation in this manner, there is effected approximately 50 per cent conversion of the monomeric chloroprene to polymeric chloroprene.

To the resulting mass is now added an antioxidant, e. g., 10 parts pyrogallol, hydroquinone or other antioxidant, and a coagulating agent, e. g., 60 parts magnesium chloride.

The emulsion containing the antioxidant and the coagulating agent is now distilled. A fraction comprising unpolymerized and lowly polymerized chloroprene is obtained upon vacuum distillation as a clear, colorless distillate. This fraction advantageously is stored in a suitable vessel maintained at a low temperature, say minus 25° C. or lower, and may be re-used in the process.

Distillation is continued under about 10 mm. mercury pressure until the polymer has coagulated and has separated from the liquid in the form of a soft, semi-solid mass. This coagulation of the polymer usually takes place after distillation has proceeded for about 40 or 50 minutes. A total of 172 parts unpolymerized and partially polymerized chloroprene was vaporized and recovered. The coagulated mass is separated from the liquid dispersion media, washed until substantially all the coagulating agent has been removed, pressed free of water by working on hot rolls or the like, and then dried at a suitable temperature to remove the last traces of water. Antioxidants may be incorporated into the dried polymer. Phenyl beta naphthylamine, for example, may be kneaded into the polymeric mass. The resulting product is a light-brown, crepe-like semi-transparent mass having a slight odor.

While we have described our invention with particular reference to chloroprene as the polymerizable organic compound employed, it will be obvious to those skilled in the art that the method of this invention also is applicable to the polymerization of any other polymerizable organic compound or mixture of such compounds. Illustrative examples of such compounds are the vinyl halides, e. g., vinyl chloride, etc., vinylidene halides, e. g., vinylidene chloride, the vinyl esters, e. g., vinyl acetate, etc., esters of acrylic and alkacrylic acids, e. g., methyl, ethyl, propyl, butyl, etc., esters of acrylic, methacrylic, ethacrylic, etc., acids, acrylic and alkacrylic nitriles, butadiene, isoprene, vinyl cyclic compounds, e. g., styrene, methyl styrene, para chloro styrene, divinyl benzene, etc., unsaturated ethers, e. g., ethyl vinyl ether, methallyl propyl ether, etc., unsaturated ketones, e. g., divinyl ketone, etc., methylene malonic esters, allyl and methallyl esters, etc. Appropriate mixtures of such compounds also may be employed. Additional examples of polymerizable organic compounds or mixtures thereof to which the present invention is applicable are given in the copending application of Gaetano F. D'Alelio, Serial No. 313,103, filed January 9, 1940, and assigned to the same assignee as the present invention, and in the copending D'Alelio and other applications assigned to the same assignee as this invention that are referred to in the said D'Alelio application.

From the foregoing description it will be seen that our invention provides a method which comprises the steps of forming an emulsion containing a polymerized organic compound, adding to the resulting emulsion a coagulating agent in an amount insufficient to cause coagulation of the polymerized organic compound but sufficient to cause coagulation when the emulsion is concentrated to a substantially lesser volume, concentrating the emulsion in the presence of the coagulating agent to an extent such that coagulation of the dispersed, polymerized organic compound is effected, and isolating the coagulated compound from the other components of the mass. More particularly the invention provides a method which comprises the steps of dispersing a monomeric organic compound containing a

grouping in a liquid dispersion media, at least partially polymerizing said organic compound while so dispersed, adding to the resulting mass a coagulating agent in an amount insufficient to cause coagulation of the dispersed, polymerized organic compound but sufficient to cause coagulation when the said mass is concentrated to a substantially lesser volume, heating the coagulant-containing mass until a substantial proportion of volatile components has vaporized and the dispersed, polymerized organic compound has coagulated, separating the coagulated compound from the mass, and washing and drying the polymerized organic compound thereby obtained.

What we claim as new and desire to secure by Letters Patent of the United States is:

1. The method which comprises the steps of forming an aqueous emulsion containing a polymerized synthetic organic compound which in monomeric form contains a

grouping, adding to the resulting emulsion a coagulating agent in an amount insufficient to cause coagulation of the polymerized organic compound but sufficient to cause coagulation when the emulsion is concentrated to a substantially lesser volume, concentrating the emulsion in the presence of the coagulating agent to an extent such that coagulation of the dispersed, polymerized organic compound is effected, and isolating the coagulated compound from the liquid components of the mass.

2. The method which comprises the steps of dispersing a monomeric organic compound containing a

grouping in a liquid dispersion media, comprising water, at least partially polymerizing said organic compound while so dispersed, adding to the resulting mass a coagulating agent in an amount insufficient to cause coagulation of the dispersed, polymerized organic compound but sufficient to cause coagulation when the said mass is concentrated to a substantially lesser volume, heating the coagulant-containing mass until a substantial proportion of volatile components has volatilized and the dispersed, polymerized organic compound has coagulated, separating the coagulated compound from the remaining liquid mass, and washing and drying the polymerized organic compound thereby obtained.

3. A method as in claim 2 wherein an antioxidant is added to the liquid mass containing dispersed, at least partially polymerized organic compound prior to heating said mass to vaporize volatile components and to coagulate said dispersed compound.

4. A method as in claim 1 wherein the coagulating agent is magnesium chloride.

5. The process of producing polymerized chloro-2-butadiene-1,3 of improved properties which comprises forming an aqueous emulsion containing polymerized chloro-2-butadiene-1,3, adding to said emulsion a coagulating agent comprising magnesium chloride in an amount insufficient to cause coagulation of the polymerized chloro-2-butadiene-1,3 but sufficient to cause coagulation thereof when the emulsion is concentrated to a substantially lesser volume, concentrating the emulsion in the presence of the said coagulating agent to an extent such that coagulation of the dispersed, polymerized chloro-2-butadiene-1,3 is effected, separating the coagulated polymerized chloro-2-butadiene-1,3 from the remaining liquid components of the mass, and washing and drying the polymerized chloro-2-butadiene-1,3 thereby obtained.

6. The method which comprises effecting at least partial polymerization of a polymerizable mass containing a vinyl ester while the said mass is dispersed in a liquid dispersion medium comprising water, adding to the resulting product a coagulating agent in an amount insufficient to cause coagulation of the dispersed polymerized mass but sufficient to cause coagulation thereof when the liquid is concentrated to a substantially lesser volume, concentrating the liquid containing the dispersed polymerized mass in the presence of the coagulating agent until coagulation of the said dispersed mass is effected, and separating the coagulated mass from the dispersion medium.

7. The method which comprises emulsion-polymerizing chloro-2-butadiene-1,3 in an aqueous dispersion medium until approximately 50 per cent of the monomer has been converted to polymeric chloro-2-butadiene-1,3, adding to the resulting mass (1) a small amount of an antioxidant and (2) a coagulating agent in an amount insufficient to cause coagulation of the polymeric chloro-2-butadiene-1,3, distilling the thus modified mass under about 10 mm. pressure until the polymer coagulates and separates from the liquid in the form of a soft, semi-solid mass, and washing and drying the coagulated mass.

RYUKICHI KITANI.
NAOICHI TAKASHIMA.